United States Patent
Yamada et al.

(10) Patent No.: US 8,231,174 B2
(45) Date of Patent: Jul. 31, 2012

(54) SEAT STRUCTURE AND SEAT CONTRACTION METHOD

(75) Inventors: Masayuki Yamada, Aichi (JP); Hideki Kobayashi, Ann Arbor, MI (US); Takeshi Tokai, Okazaki (JP); Masaki Mori, Tajimi (JP); Keisuke Onoda, Nagoya (JP); Makoto Itou, Aichi (JP)

(73) Assignees: Toyota Jidosha Kabushiki Kaisha, Toyota-shi, Aichi-ken (JP); Toyota Boshoku Kabushiki Kaisha, Kariya-shi, Aichi-ken (JP)

( * ) Notice: Subject to any disclaimer, the term of this patent is extended or adjusted under 35 U.S.C. 154(b) by 706 days.

(21) Appl. No.: 11/921,554

(22) PCT Filed: Jun. 6, 2006

(86) PCT No.: PCT/JP2006/311697
§ 371 (c)(1),
(2), (4) Date: Jun. 25, 2009

(87) PCT Pub. No.: WO2006/132400
PCT Pub. Date: Dec. 14, 2006

(65) Prior Publication Data
US 2009/0302652 A1     Dec. 10, 2009

(30) Foreign Application Priority Data
Jun. 6, 2005   (JP) .................................. 2005-165679

(51) Int. Cl.
*A47C 7/14*     (2006.01)

(52) U.S. Cl. ................................ 297/284.11; 297/284.9
(58) Field of Classification Search ............... 297/284.9, 297/284.11
See application file for complete search history.

(56) References Cited

U.S. PATENT DOCUMENTS 4,629,248 A * 12/1986 Mawbey ............... 297/284.11 X
7,708,343 B2 * 5/2010 Kayumi et al. ............ 297/284.9

FOREIGN PATENT DOCUMENTS

| CN | 1526584 | 9/2004 |
| DE | 10345834 | 4/2005 |
| EP | 0204443 | 12/1986 |
| JP | 62-131933 | 8/1987 |

(Continued)

OTHER PUBLICATIONS

Office Action dated Jun. 18, 2009 for DE 112006001437.

(Continued)

*Primary Examiner* — Anthony D Barfield
(74) *Attorney, Agent, or Firm* — Finnegan, Henderson, Farabow, Garrett & Dunner, LLP

(57) ABSTRACT

When a seat (10) is to be stowed, a seat pad (28) is moved toward a seat (10) reverse side, pad side portions (32) are rotated toward the seat (10) reverse side with respect to a pad center portion (30), and a center portion (12) and side portions (14) of the seat (10) are contracted. Here, interlockingly with contraction of the side portions (14), a skin (42) is bent and folded in at portions covering distal ends of vertical walls (22) of a wall panel (18) and at second fixing portions (42B). Due thereto, slack of the skin (42) at seat (10) lateral direction end surfaces can be taken in.

12 Claims, 11 Drawing Sheets

FOREIGN PATENT DOCUMENTS

| | | |
|---|---|---|
| JP | 2-87630 | 7/1990 |
| JP | 5-18957 | 3/1993 |
| JP | 6284940 | 10/1994 |
| JP | 7-13245 | 3/1995 |
| JP | 10-313983 | 12/1998 |
| JP | 2000-316663 | 11/2000 |
| JP | 2001-61588 | 3/2001 |

OTHER PUBLICATIONS

Office Action dated Jul. 27, 2009 for DE 112006001437.
Office Action dated Jul. 24, 2009 for Chinese Appl. No. 200680020094.2.
Search Report, Dec. 5, 2007.
Written Opinion, Dec. 5, 2007.

\* cited by examiner

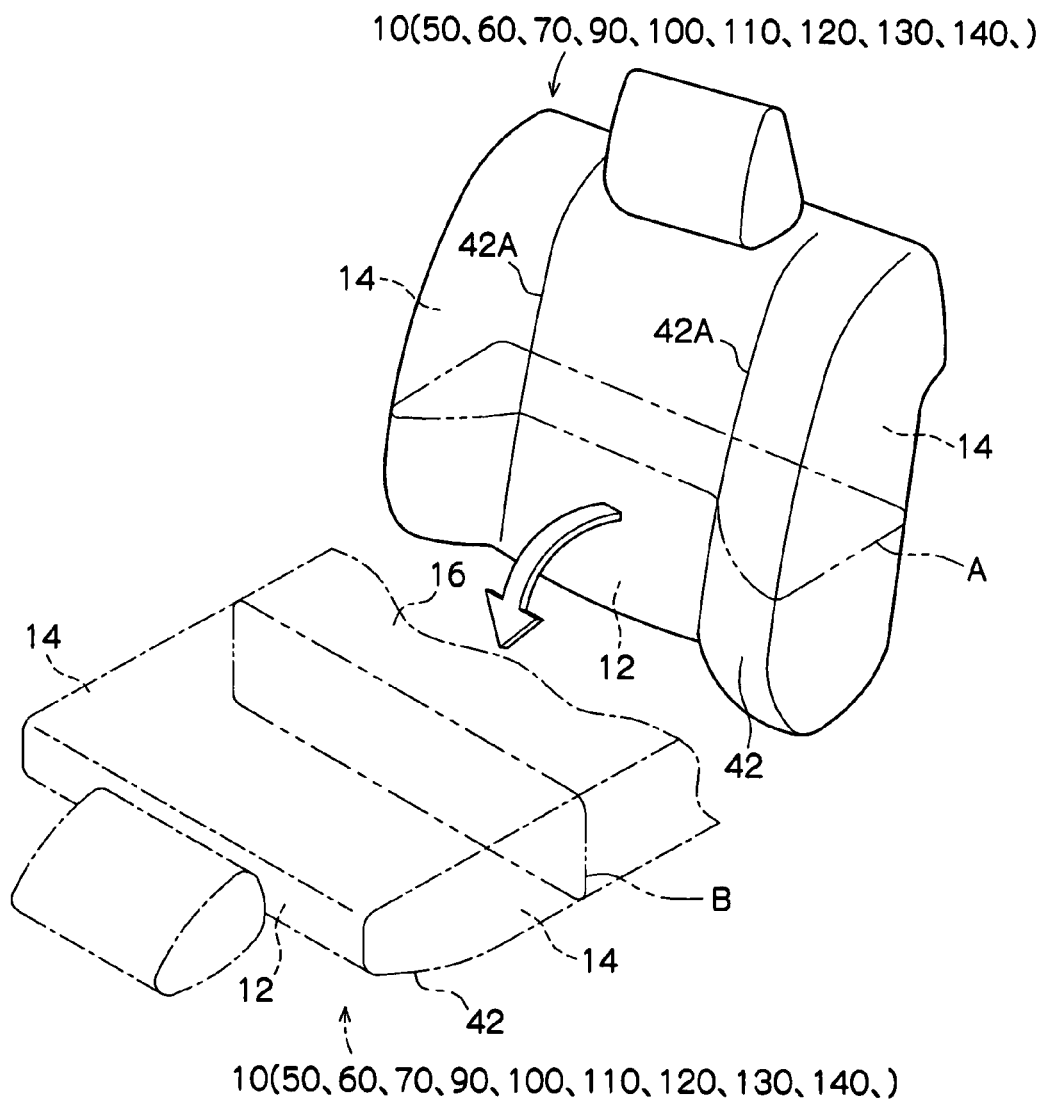

SEAT STRUCTURE AND SEAT CONTRACTION METHOD

TECHNICAL FIELD

The present invention relates to a seat structure and a seat contraction method in which a contracting portion of a seat end portion is made to be contractible.

BACKGROUND TECHNOLOGY

As a seat structure, there are those in which, at a seat cushion, the left and right seat side portions are made to be movable to a high position and a low position with respect to a central ceiling plate portion (refer to, for example, Patent Document 1).

In this seat structure, a seat pad within the seat side portion is covered by a seat cover.

However, in this seat structure, when the seat side portions are moved to the low position with respect to the ceiling plate portion, slack arises at the seat cover at the seat cushion end surfaces.

[Patent Document 1] Japanese Patent Application Laid-Open (JP-A) No. 2000-316663

DISCLOSURE OF THE INVENTION

In view of the aforementioned, an object of the present invention is to provide a seat structure and a seat contraction method which, at the time when a contracting portion of a seat end portion is contracted, can suppress slack, at a seat end surface, of a covering member which covers the contracting portion.

A seat structure of claim 1 comprises: a contracting portion provided at an end portion of a seat, and made to be contractible; a covering member covering the contracting portion; an internal member provided within the contracting portion, and having elasticity, and at which a plurality of concave portions are formed at the seat reverse side surface, and at which a convex portion is formed between the concave portions; a supporting member supporting the concave portion formation portion of the internal member from the seat reverse side by, in an extended state, contacting the convex portion; and a taking-in component taking in slack of the covering member at the seat end surface when the contracting portion is contracted.

In the seat structure of claim 1, the contracting portion provided at the end portion of the seat is made to be contractible. The covering member covers the contracting portion.

Further, the internal member, which is provided within the contracting portion, has elasticity. The concave portions are formed in the seat reverse side surface of the internal member. The supporting member supports the concave portion formation portion of the internal member from the seat reverse side. Therefore, deformation due to the concave portions of the internal member can be suppressed.

Here, when the contracting portion is contracted, the taking-in component takes in the slack of the covering member at the seat end surface. Therefore, slack of the covering member at the seat end surface can be suppressed.

A seat structure of claim 2 has the feature that, in the seat structure of claim 1, the taking-in component pulls the covering member into the seat interior interlockingly with contraction of the contracting portion.

In the seat structure of claim 2, the taking-in component pulls the covering member into the seat interior, interlockingly with the contraction of the contracting portion. Therefore, slack of the covering member at the seat end surface can be taken in appropriately.

A seat structure of claim 3 has the feature that, in the seat structure of claim 1 or claim 2, the taking-in component folds in the covering member interlockingly with contraction of the contracting portion.

In the seat structure of claim 3, the taking-in component folds in the covering member, interlockingly with the contraction of the contracting portion. Therefore, slack of the covering member at the seat end surface can be taken in appropriately.

A seat structure of claim 4 has the feature that, in the seat structure of any one of claim 1 through claim 3, the taking-in component has a contracting region which is provided at the covering member and which contracts interlockingly with contraction of the contracting portion.

In the seat structure of claim 4, the taking-in component has the contracting region which is provided at the covering member. The contracting region contracts interlockingly with the contraction of the contracting portion. Therefore, slack of the covering member at the seat end surface can be taken in appropriately.

A seat structure of claim 5 has the feature that, in the seat structure of any one of claim 1 through claim 4, the taking-in component has: a non-interlocked portion on which the covering member is fixed, and which is not interlocked with contraction of the contracting portion; and an interlocked portion which is disposed further toward the seat obverse side than the non-interlocked portion, and on which the covering member is fixed, and which is interlocked with contraction of the contracting portion and which moves the covering member toward the seat interior.

In the seat structure of claim 5, the taking-in component has the non-interlocked portion and the interlocked portion. The covering member is fixed on the non-interlocked portion and the interlocked portion. The interlocked portion is disposed further toward the seat obverse side than the non-interlocked portion. The non-interlocked portion is not interlocked with contraction of the contracting portion. The interlocked portion is interlocked with contraction of the contracting portion and moves the covering member toward the seat interior. Therefore, slack of the covering member at the seat end surface can be taken in appropriately by a simple structure.

A seat structure of claim 6 has the feature that, in the seat structure of claim 5, when the contracting portion is contracted, a fixed position of the covering member on the interlocked portion is disposed further toward the seat central side than the non-interlocked portion.

In the seat structure of claim 6, when the contracting portion is contracted, the fixed position of the covering member on the interlocked portion is disposed further toward the seat central side than the non-interlocked portion. Therefore, a gap which opens toward the seat reverse side is not formed between the non-interlocked portion and the interlocked portion. Accordingly, the appearance from the reverse side of the seat can be made to be better, and entry of foreign matter from the seat reverse side into between the non-interlocked portion and the interlocked portion can be suppressed.

A seat structure of claim 7 has the feature that, in the seat structure of any one of claim 1 through claim 4, wherein the taking-in component has: a non-interlocked portion on which the covering member is fixed, and which is not interlocked with contraction of the contracting portion; an interlocked portion which is disposed further toward the seat obverse side than the non-interlocked portion, and on which the covering member is fixed, and which is interlocked with contraction of the contracting portion; and a connecting member connecting a portion of the covering member between the non-interlocked portion and the interlocked portion, and an interior portion of the seat.

In the seat structure of claim 7, the taking-in component has the non-interlocked portion and the interlocked portion. The covering member is fixed on the non-interlocked portion and the interlocked portion. The interlocked portion is disposed further toward the seat obverse side than the non-interlocked portion. The non-interlocked portion is not interlocked with contraction of the contracting portion. The interlocked portion is interlocked with contraction of the contracting portion. Moreover, the taking-in component has the connecting member. The connecting member connects the portion of the covering member between the non-interlocked portion and the interlocked portion, and an interior portion of the seat. Therefore, for example, due to the connecting member abutting at least one of the non-interlocked portion and the interlocked portion interlockingly with the contraction of the contracting portion and moving the covering member toward the seat interior, slack of the covering member at the seat end surface can be taken in appropriately.

A seat structure of claim 8 has the feature that, in the seat structure of any one of claim 2 through claim 7, the taking-in component has an elastic member which pulls the covering member into the seat interior interlockingly with contraction of the contracting portion.

In the seat structure of claim 8, the taking-in component has the elastic member. The elastic member pulls the covering member into the seat interior interlockingly with contraction of the contracting portion. Therefore, slack of the covering member at the seat end surface can be taken in appropriately.

A seat structure of claim 9 has the feature that, in the seat structure of any one of claim 2 through claim 8, interlockingly with contraction of the contracting portion, the taking-in component pulls the covering member into the seat interior from the seat end surface.

In the seat structure of claim 9, interlockingly with the contraction of the contracting portion, the taking-in component pulls the covering member into the seat interior from the seat end surface. Therefore, differently than a case in which the taking-in component pulls the covering member into the seat interior from between the contracting portion and the center portion of the seat, generation of a gap between the contracting portion and the center portion of the seat can be suppressed.

A seat structure of claim 10 has the feature that the seat structure of any one of claim 1 through claim 9 comprising a sliding member which is provided between the contracting portion and the covering member and which slides the covering member with respect to the contracting portion.

In the seat structure of claim 10, a sliding member, which is provided between the contracting portion and the covering member, slides the covering member with respect to the contracting portion. Therefore, taking in of the slack of the covering member at the seat end surface by the taking-in component can be made easy.

A seat structure of claim 11 has the feature that, in the seat structure of any one of claim 3 through claim 10, the taking-in component has a fold-in member which is provided so as to project from the contracting portion toward the seat central side, and which folds in the covering member interlockingly with contraction of the contracting portion.

In the seat structure of claim 11, the taking-in component has the fold-in member which projects from the contracting portion toward the seat central side. The fold-in member folds in the covering member interlockingly with the contraction of the contracting portion. Therefore, slack of the covering member at the seat end surface can be taken in appropriately.

A seat structure of claim 12 has the feature that the seat structure of claim 11 comprises a pliable member provided at the seat obverse side of the fold-in member.

In the seat structure of claim 12, the pliable member is provided at the seat obverse side of the fold-in member. Therefore, a disagreeable sensation due to the fold-in member at the obverse of the seat can be mitigated.

A seat structure of claim 13 has the feature that, in the seat structure of any one of claim 4 through claim 12, the contracting region is at least one of a region which is wave-shaped in cross-section and an elastic region.

In the seat structure of claim 13, the contracting region is at least one of the region which is wave-shaped in cross-section and the elastic region. Therefore, the contracting region can appropriately contract interlockingly with the contraction of the contracting portion.

A seat structure of claim 14 comprises: a contracting portion provided at an end portion of a seat, and made to be contractible; a non-interlocked portion provided at the contracting portion, and not interlocked with contraction of the contracting portion; an interlocked portion provided at the contracting portion further toward the seat obverse side than the non-interlocked portion, and interlocked with contraction of the contracting portion; a covering member covering the interlocked portion; and an extending member provided at the non-interlocked portion, and extending to the covering member.

In the seat structure of claim 14, the contracting portion which is provided at an end portion of the seat is made to be contractible. The non-interlocked portion which is provided at the contracting portion is not interlocked with the contraction of the contracting portion. The interlocked portion, which is provided at the contracting portion further toward the seat obverse side than the non-interlocked portion, is interlocked with the contraction of the contracting portion.

Here, the covering member covers the interlocked portion. The extending member, which is provided at the non-interlocked portion, extends to the covering member. In this way, because the covering member does not cover between the interlocked portion and the non-interlocked portion, slack of the covering member at the seat end surface can be suppressed when the contracting portion is contracted.

A seat structure of claim 15 has the feature that, in the seat structure of claim 14, the extending member is made to be contractible.

In the seat structure of claim 15, the extending member is made to be contractible. Therefore, due to the extending member being contracted when the contracting portion is contracted, the thickness of the seat can be made to be thin.

A seat contraction method of claim 17 is a seat contraction method of a seat structure having: a contracting portion provided at an end portion of a seat, and made to be contractible; a covering member covering the contracting portion; an internal member provided within the contracting portion, and having elasticity, and at which a plurality of concave portions are formed at the seat reverse side surface, and at which a convex portion is formed between the concave portions; and a supporting member supporting the concave portion formation portion of the internal member from the seat reverse side by, in an extended state, contacting the convex portion, and has the feature that a taking-in component takes in slack of the covering member at the seat end surface when the contracting portion is contracted.

A seat contraction method of claim 18 has the feature that, in the seat contraction method of claim 17, the taking-in component pulls the covering member into the seat interior interlockingly with contraction of the contracting portion.

A seat contraction method of claim 19 has the feature that, in the seat contraction method of claim 17 or claim 18, the taking-in component folds in the covering member interlockingly with contraction of the contracting portion.

A seat contraction method of claim 20 has the feature that, in the seat contraction method of any one of claim 17 through claim 19, a contracting region of the taking-in component, which is provided at the covering member, contracts interlockingly with contraction of the contracting portion.

BRIEF DESCRIPTION OF THE DRAWINGS

FIG. 2 is a perspective view showing the state of regular use (the solid lines) and the stowed state (the one-dot chain lines) of the seats relating to the first embodiment through a tenth embodiment of the present invention.

BEST MODES FOR IMPLEMENTING THE INVENTION

[First Embodiment]

Figure 1A:
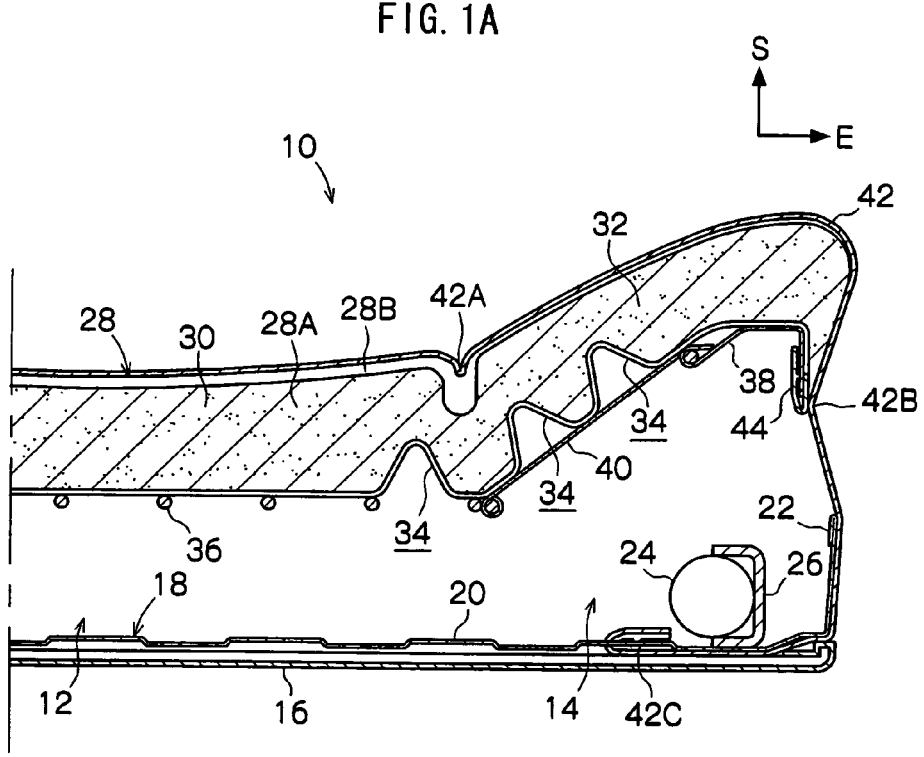
FIG. 1A is a cross-sectional view showing main portions in a state of regular use of a seat relating to a first embodiment of the present invention.

Main portions of a seat 10, which relates to a first embodiment and which is structured by applying a seat structure and a seat contraction method of the present invention, are shown in a cross-sectional view in FIG. 1A. The seat 10 is shown in FIG. 2 by solid lines in a perspective view seen from an obverse side. Further, in the drawings, the obverse side of the seat 10 is indicated by arrow S, and a lateral direction (transverse direction) outer side of the seat 10 is indicated by arrow E.

The seat 10 relating to the present embodiment is a seat back of a vehicle. The seat 10 stands substantially vertically from a rear end of a seat cushion of the vehicle (not shown) which is disposed substantially horizontally. As shown by the one-dot chain lines in FIG. 2, the seat 10 is made able to be stowed by being rotated (collapsed forward) around its lower end toward the seat cushion and being superposed on the seat cushion.

The interior of the lateral direction intermediate portion of the seat 10 is a center portion 12. The interiors of the lateral direction both end portions of the seat 10 are side portions 14 which respectively serve as contracting portions.

A plate-shaped back board 16, which structures a non-interlocked portion of a taking-in component, is provided at the reverse side portion of the seat 10. The outer side surface of the back board 16 is planar and structures the reverse surface of the seat 10. A plate-shaped wall panel 18, which structures the non-interlocked portion of the taking-in component, is provided at the reverse side portion within the seat 10. The wall panel 18 is formed in a substantial U-shape in cross-section and has a lateral wall 20 and a pair of vertical walls 22. The lateral wall 20 is fixed to the back board 16, and the wall panel 18 is thereby fixed to the back board 16. Further, the vertical walls 22 extend toward the seat 10 obverse side from positions of lateral direction end portions of the back board 16.

At the side portion 14, a vertical frame 24, which is cylindrical tube shaped (or may be cylindrical column shaped) and which structures the non-interlocked portion of the taking-in component, is fixed to the reverse side portion within the seat 10. The vertical frame 24 is disposed further toward the seat 10 obverse side than the lateral wall 20 of the wall panel 18. A frame 26, which is substantially U-shaped in cross-section and structures the non-interlocked portion of the taking-in component, is disposed at the outer periphery at the seat 10 lateral direction outer side of the vertical frame 24. The frame 26 is fixed to the lateral wall 20 of the wall panel 18. Due thereto, the seat 10 is reinforced by the vertical frames 24 and the frames 26.

A seat pad 28 is provided at the obverse side portion within the seat 10. The seat pad 28 is formed of urethane and has elasticity. The seat pad 28 is structured such that a pliable portion 28B is provided at the peripheral portion of a main body portion 28A. The pliability of the pliable portion 28B is high as compared with the main body portion 28A. The portion of the seat pad 28 disposed at the center portion 12 is made to be a pad center portion 30. The portions of the seat pad 28 disposed at the side portions 14 are made to be pad side portions 32 which serve as internal members which structure interlocked portions of the taking-in component.

The thickness of the pliable portion 28B is made to be thick at the seat 10 obverse side region at the border portion between the pad center portion 30 and the pad side portion 32 of the seat pad 28. A predetermined number (3) of concave portions 34, which are triangular in cross-section, are formed at the seat 10 reverse side surface of the seat pad 28 in a vicinity of the border portion between the pad center portion 30 and the pad side portion 32. Due thereto, rotation of the pad side portion 32 with respect to the pad center portion 30 is made easy, and the vicinity of the border portion between the pad center portion 30 and the pad side portion 32 of the seat pad 28 elastically contracts easily toward the seat 10 lateral direction central side.

A spring 36, which is shaped as a curvingly wave-shaped rod, is fixed to the seat 10 reverse side surface of the pad center portion 30. The spring 36 supports the pad center portion 30 from the seat 10 reverse side. A movable plate 38, which structures the interlocked portion of the taking-in component, is fixed to the seat 10 reverse side surface at the seat 10 lateral direction outer side end of the pad side portion 32. An extending/contracting mechanism (not shown), which serves as a contracting mechanism, spans between the movable plate 38 and the lateral wall 20 of the wall panel 18, and the pad side portion 32 thereby projects-out toward the seat 10 obverse side of the pad center portion 30. A cotton cloth 40, which serves as a supporting member and which has flexibility, spans between the movable plate 38 and the spring 36. The cotton cloth 40 is extended and supports the concave portion 34 formation portion of the pad side portion 32 from the seat 10 reverse side.

The center portion 12 and the side portions 14 of the seat 10 are covered by a skin 42 serving as a covering member. The skin 42 has flexibility. The skin 42 covers the seat 10 obverse side surface of the pad center portion 30, the seat 10 obverse side surfaces and lateral direction end surfaces of the pad side portions 32, the vertical walls 22 of the wall panel 18, and the lateral wall 20 of the wall panel 18. The skin 42 is fixed to the main body portion 28A of the seat pad 28 at first fixing portions 42A which cover the border portions between the pad center portion 30 and the pad side portions 32. The skin 42 is fixed by fixing members 44 (hog rings or resin hooks or the like) to the movable plates 38 at second fixing portions 42B which serve as fix positions and cover the seat 10 lateral direction end surfaces of the pad side portions 32. Both final ends 42C of the skin 42 are fixed to vicinities of both seat 10 lateral direction ends of the lateral wall 20.

Next, operation of the present embodiment will be described.

Figure 1B:
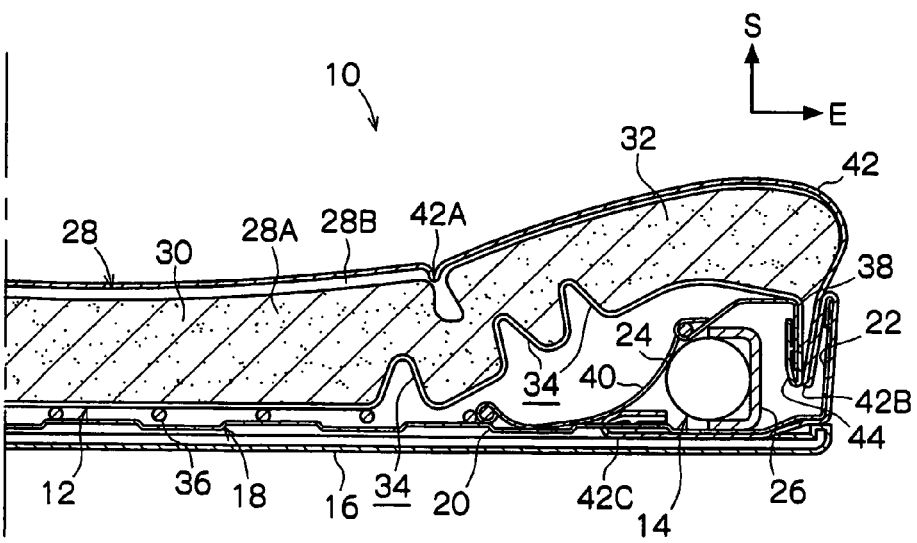
FIG. 1B is a cross-sectional view showing main portions in a stowed state of the seat relating to the first embodiment of the present invention.

At the seat 10 of the above-described structure, when the seat 10 is to be stowed from the state of regular use, due to the extending/contracting mechanisms being contraction-operated and the movable plates 38 being moved toward the seat 10 reverse side, as shown in FIG. 1B, the seat pad 28 (the pad center portion 30 and the pad side portions 32) is moved toward the seat 10 reverse side, and the pad side portions 32 are rotated toward the seat 10 reverse side with respect to the pad center portion 30, and the center portion 12 and the side portions 14 of the seat 10 are contracted. Due thereto, the thickness in the stowed state of the seat 10 becomes thinner.

Further, when the seat 10 is to be returned from the stowed state to the state of regular use, due to the extending/contracting mechanisms being extension-operated and the movable plates 38 being moved toward the seat 10 obverse side, as shown in FIG. 1A, the seat pad 28 (the pad center portion 30 and the pad side portions 32) is moved toward the seat 10 obverse side, and the pad side portions 32 are rotated toward the seat 10 obverse side with respect to the pad center portion 30, and the center portion 12 and the side portions 14 of the seat 10 are extended.

By the way, when the seat 10 is stowed, due to the above-described contraction of the side portions 14 of the seat 10, as shown in FIG. 2, an entire peripheral length B of the seat 10 becomes shorter than an entire peripheral length A of the seat 10 in the state of regular use.

Here, when the seat 10 is to be stowed, interlockingly with the contraction of the side portions 14, the skin 42 is bent at the portions which cover the vertical wall 22 distal ends of the wall panel 18 and at the second fixing portions 42B (the fix positions with the movable plates 38), and is folded in (pulled into the seat 10 interior). Due thereto, slack of the skin 42 (the portions covering the side portions 14) at the seat 10 lateral direction end surfaces is taken in, and slack of the skin 42 at the seat 10 lateral direction end surfaces can be suppressed. Accordingly, the occurrence of useless wrinkles or tearing of the skin 42 due to the skin 42 protruding toward the lateral direction outer sides of the seat 10 can be suppressed.

Moreover, when the seat 10 is stowed, the second fixing portions 42B of the skin 42 (the fix positions with the movable plates 38) are disposed further toward the seat 10 lateral direction central side than the vertical walls 22 of the wall panel 18. Therefore, gaps which open toward the reverse side of the seat 10 are not formed at the lateral direction end portions of the seat 10 (between the vertical walls 22 of the wall panel 18 and the movable plates 38). Accordingly, the appearance from the reverse side (upper side) of the seat 10 can be made to be better, and entry of foreign matter such as dust or the like from the reverse side of the seat 10 into the lateral direction end portions of the seat 10 (between the vertical walls 22 of the wall panel 18 and the movable plates 38) can be suppressed.

Furthermore, when the seat 10 is to be stowed, even if the skin 42 is not made to slide with respect to the pad side portions 32, slack of the skin 42 at the seat 10 lateral direction end surfaces is taken in. Therefore, slack of the skin 42 at the seat 10 lateral direction end surfaces can be easily taken in.

Further, due to the predetermined number of concave portions 34 being formed in the seat 10 reverse side surface of the seat pad 28, the seat pad 28 is easily elastically contracted toward the seat 10 lateral direction central side. Therefore, when the seat 10 is to be stowed, the seat pad 28 is elastically contracted toward the seat 10 lateral direction central side while the pad side portions 32 are rotated toward the seat 10 reverse side with respect to the pad center portion 30. Accordingly, projecting-out of the seat pad 28 from the back board 16 toward the seat 10 lateral direction outer sides can be suppressed.

Furthermore, in the state of regular use of the seat 10, the cotton cloths 40, which are extended, support the concave portion 34 formation portions of the pad side portions 32 from the seat 10 reverse side. Therefore, deformation of the pad side portions 32 due to the concave portions 34 can be suppressed, and the seat pad 28 can appropriately support the vehicle occupant (the seat 10 user).

Further, due to the skin 42 at the seat 10 lateral direction end surfaces being structured so as to be pulled into the seat 10 interior when the seat 10 is to be stowed, the need for the center portion 12 covering portion and the side portion 14 covering portions of the skin 42 to be divided is eliminated and they are made integral. Therefore, gaps which open toward the seat 10 obverse side are not formed between the center portion 12 and the side portions 14. Accordingly, in the state of regular use of the seat 10, the appearance from the obverse side of the seat 10 can be made to be better, and entry of foreign matter such as dust or the like from the seat 10 obverse side into between the center portion 12 and the side portions 14 of the seat 10 can be suppressed.

Moreover, the seat 10 is covered by the skin 42 to the lateral direction end surfaces. Therefore, the appearance from the lateral direction outer sides of the seat 10 in the state of regular use of and the stowed state of the seat 10 can be made to be better.

[Second Embodiment]

Figure 3A:
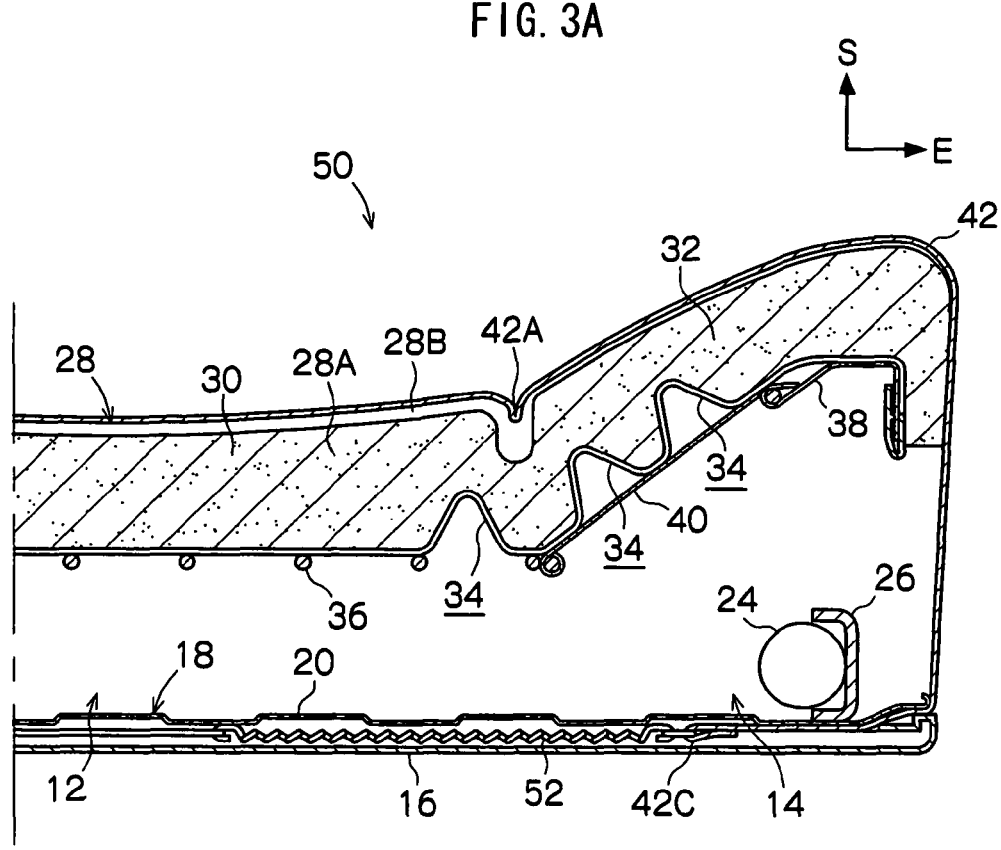
FIG. 3A is a cross-sectional view showing main portions in a state of regular use of a seat relating to a second embodiment of the present invention.

Main portions of a seat 50, which relates to a second embodiment and which is structured by applying the seat structure and the seat contraction method of the present invention, are shown in a cross-sectional view in FIG. 3A.

The seat 50 relating to the present embodiment is substantially the same structure as the above-described first embodiment, but differs with regard to the following points.

In the seat 50 relating to the present embodiment, the pair of vertical walls 22 are not provided at the wall panel 18.

The skin 42 covers the seat 50 obverse side surface of the pad center portion 30, the seat 50 obverse side surfaces and lateral direction end surfaces of the pad side portions 32, and the lateral wall 20 of the wall panel 18. The skin 42 is not fixed to the movable plates 38. The final ends 42C of the skin 42 are connected to one ends (the seat 50 lateral direction outer side ends) of tension coil springs 52 (rubber or the like will do) which serve as elastic members of the taking-in component. The tension coil springs 52 are disposed between the lateral wall 20 of the wall panel 18 and the back board 16. The other ends (the seat 50 lateral direction inner side ends) of tension coil springs 52 are fixed.

Next, operation of the present embodiment will be described.

Figure 3B:
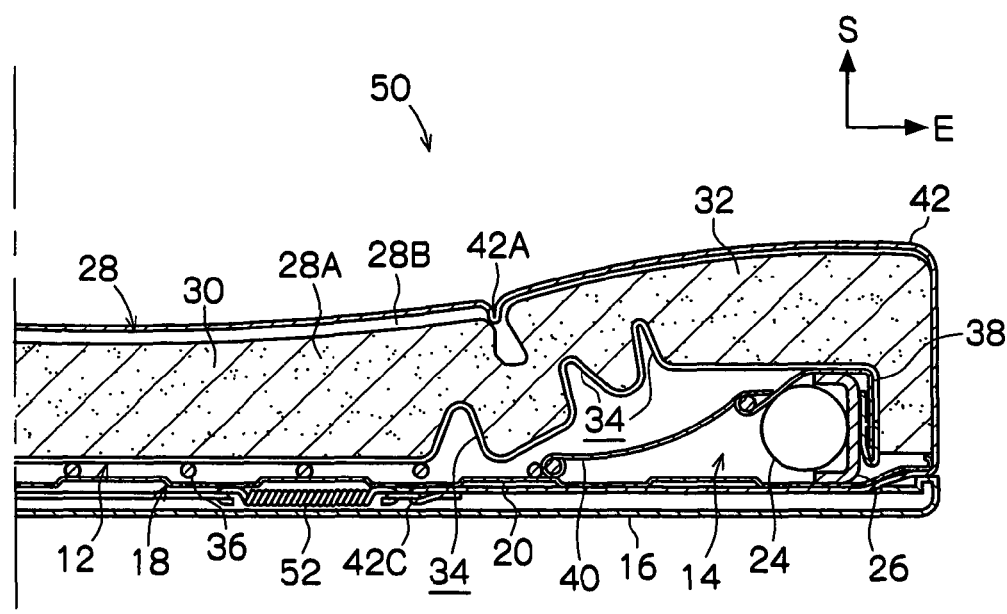
FIG. 3B is a cross-sectional view showing main portions in a stowed state of the seat relating to the second embodiment of the present invention.

In the seat 50 of the above-described structure, in the same way as in the above-described first embodiment, when the seat 50 is to be stowed from the state of regular use, the center portion 12 and the side portions 14 of the seat 50 are contracted, and the entire peripheral length B of the seat 50 in the stowed state becomes shorter than the entire peripheral length A of the seat 50 in the state of regular use, and when the seat 50 is to be returned from the stowed state to the state of regular use, the center portion 12 and the side portions 14 of the seat 50 are extended (see FIG. 2, FIG. 3A, and FIG. 3B).

Here, when the seat 50 is to be stowed, interlockingly with the contraction of the side portions 14, the skin 42 is pulled into the seat 50 interior by the elastic forces (urging forces) of the tension coil springs 52 (due to the tension coil springs 52 being contracted). Due thereto, slack of the skin 42 (the portions covering the side portions 14) at the seat 50 lateral direction end surfaces is taken in.

In this way, in the present embodiment as well, effects which are similar to the above-described first embodiment can be achieved.

[Third Embodiment]

Figure 4A:
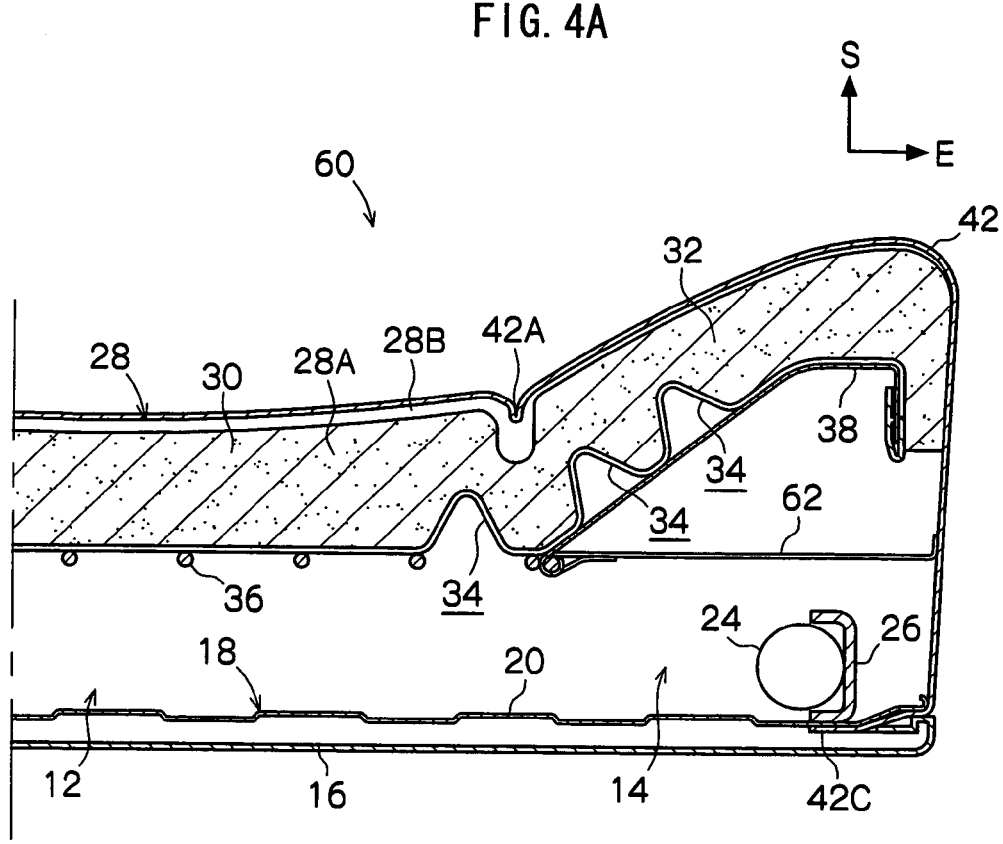
FIG. 4A is a cross-sectional view showing main portions in a state of regular use of a seat relating to a third embodiment of the present invention.

Main portions of a seat 60, which relates to a third embodiment and which is structured by applying the seat structure and the seat contraction method of the present invention, are shown in a cross-sectional view in FIG. 4A.

The seat 60 relating to the present embodiment is substantially the same structure as the above-described first embodiment, but differs with regard to the following points.

In the seat 60 relating to the present embodiment, the pair of vertical walls 22 are not provided at the wall panel 18.

The movable plate 38 is extended to the spring 36, and the cotton cloth 40 is not provided. The movable plate 38 functions as the supporting member and supports the concave portion 34 formation portion of the pad side portion 32 from the seat 60 reverse side.

The skin 42 covers the seat 60 obverse side surface of the pad center portion 30, the seat 60 obverse side surfaces and lateral direction end surfaces of the pad side portions 32, and the lateral wall 20 of the wall panel 18. The skin 42 is not fixed to the movable plates 38.

Between the skin 42, which is between the pad side portion 32 and the lateral wall 20 of the wall panel 18, and the seat 60 lateral direction central side end of the movable plate 38, is connected by a connecting fabric 62 which has flexibility and serves as a connecting member of the taking-in component. The connecting fabric 62 is extended.

Next, operation of the present embodiment will be described.

Figure 4B:
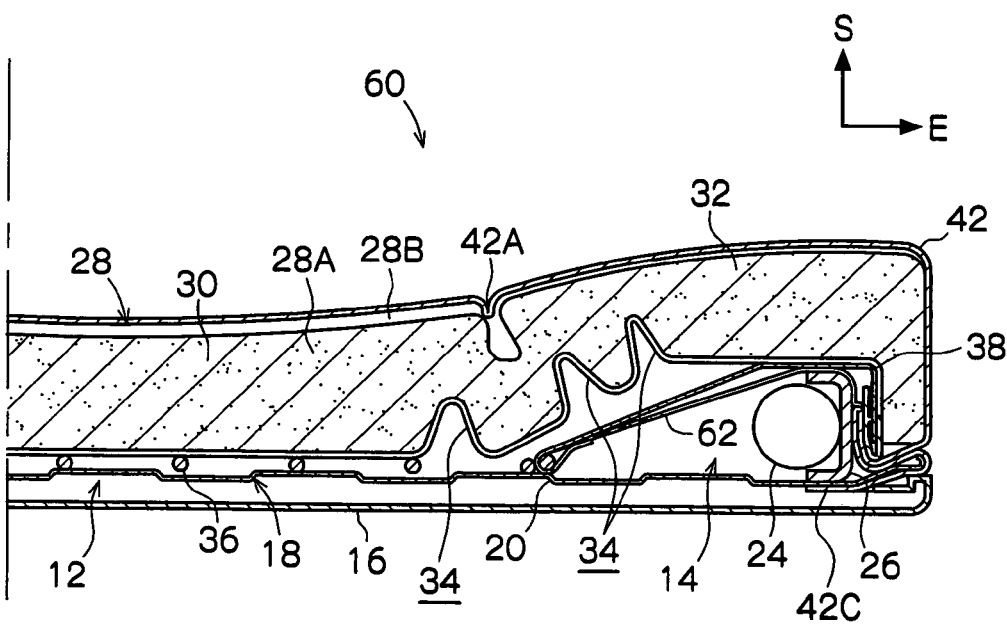
FIG. 4B is a cross-sectional view showing main portions in a stowed state of the seat relating to the third embodiment of the present invention.

In the seat 60 of the above-described structure, in the same way as in the above-described first embodiment, when the seat 60 is to be stowed from the state of regular use, the center portion 12 and the side portions 14 of the seat 60 are contracted, and the entire peripheral length B of the seat 60 in the stowed state becomes shorter than the entire peripheral length A of the seat 60 in the state of regular use, and when the seat 60 is to be returned from the stowed state to the state of regular use, the center portion 12 and the side portions 14 of the seat 60 are extended (see FIG. 2, FIG. 4A, and FIG. 4B).

Here, when the seat 60 is to be stowed, interlockingly with the contraction of the side portions 14, the connecting fabrics 62 catches on the frames 26 and is bent. Therefore, the skin 42 is pulled into the seat 60 interior by the connecting fabrics 62 and is folded in. Due thereto, slack of the skin 42 (the portions covering the side portions 14) at the seat 60 lateral direction end surfaces is taken in.

In this way, in the present embodiment as well, effects which are similar to the above-described first embodiment can be achieved.

In particular, in the state of regular use of the seat 60, the movable plates 38 support the concave portion 34 formation portions of the pad side portions 32 from the seat 60 reverse side. Therefore, deformation of the pad side portions 32 due to the concave portions 34 can be suppressed, and the seat pad 28 can appropriately support the vehicle occupant.

Note that, in the present embodiment, the connecting fabrics 62 are structured so as to be connected to the movable plates 38 (interlocked portions), but the connecting fabrics 62 may be structured so as to be connected to a non-interlocked portion such as the wall panel 18 or the like.

[Fourth Embodiment]

Figure 5A:
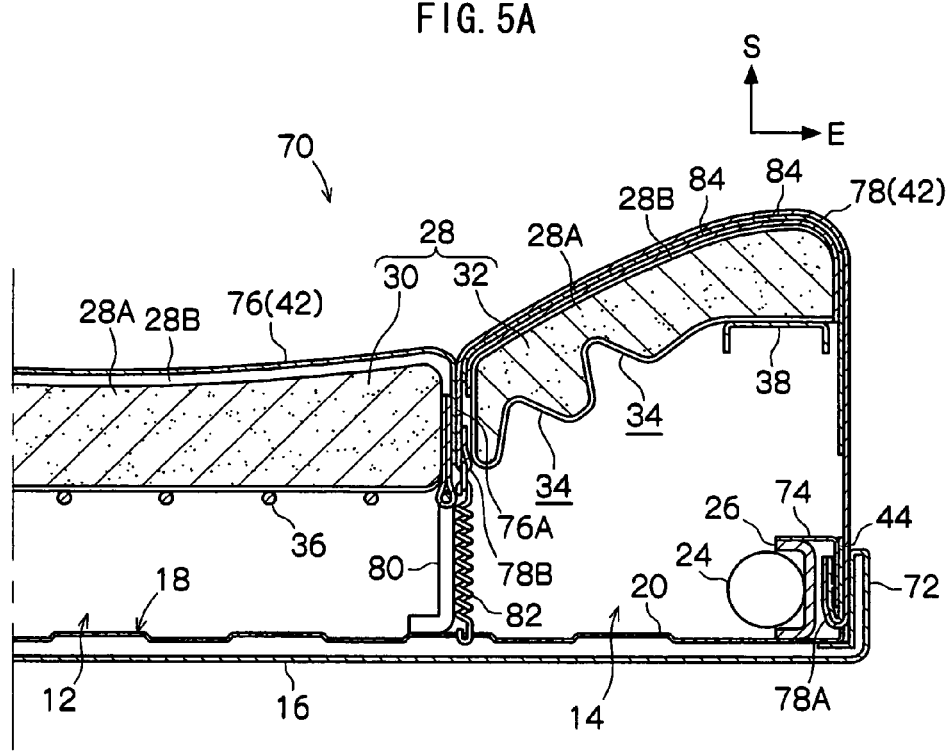
FIG. 5A is a cross-sectional view showing main portions in a state of regular use of a seat relating to a fourth embodiment of the present invention.

Main portions of a seat 70, which relates to a fourth embodiment and which is structured by applying the seat structure and the seat contraction method of the present invention, are shown in a cross-sectional view in FIG. 5A.

The seat 70 relating to the present embodiment is substantially the same structure as the above-described first embodiment, but differs with regard to the following points.

At the seat 70 relating to the present embodiment, extending walls 72 serving as extending portions are provided at the lateral direction both end portions of the back board 16. The extending walls 72 extend from the back board 16 toward the seat 70 obverse side. Further, the pair of vertical walls 22 are not provided at the wall panel 18.

A fixed plate 74, which is shaped as an L-shaped plate in cross-section, is fixed to the frame 26. The fixed plate 74 is disposed at the seat lateral direction central side of the extending wall 72.

The pad center portion 30 of the seat pad 28 and the pad side portions 32 are separated. Therefore, the rotation of the pad side portions 32 with respect to the pad center portion 30 is made easy. A predetermined number (2) of the concave portions 34, which are triangular in cross-section, are formed at the seat 70 reverse side surface of the pad center portion 30 side portions of the pad side portions 32. Therefore, elastic contraction of the pad side portions 32 toward the seat 70 lateral direction central side is made easy.

The cotton cloth 40 is not suspended between the movable plate 38 and the spring 36.

The skin 42 is separated into a skin center portion 76 and skin side portions 78. The skin center portion 76 covers the seat 70 obverse side surface of the pad center portion 30 and the seat 70 lateral direction both end surfaces of the pad center portion 30. Both final ends 76A of the skin center portion 76 are fixed by fixing mechanisms 80 to the lateral wall 20 of the wall panel 18. The skin side portions 78 cover the seat 70 obverse side surfaces of the pad side portions 32 and the seat 70 lateral direction both end surfaces of the pad side portions 32. Seat 70 lateral direction outer side final ends 78A of the skin side portions 78 are fixed by the fixing members 44 to the fixed plates 74 at the seat 70 lateral direction central sides of the extending walls 72. Seat 70 lateral direction central side final ends 78B of the skin side portions 78 are fixed to the lateral wall 20 of the wall panel 18 via tension coil springs 82 (rubber or the like will do) which serve as elastic members of the taking-in component.

Tapes 84 for lubrication, which serve as sliding members and which have flexibility, are respectively adhered to the obverse of the pad side portion 32 and to the reverse surface of the skin side portion 78. The sliding surfaces (obverses) of the pair of tapes 84 for lubrication contact one another.

Next, operation of the present embodiment will be described.

Figure 5B:
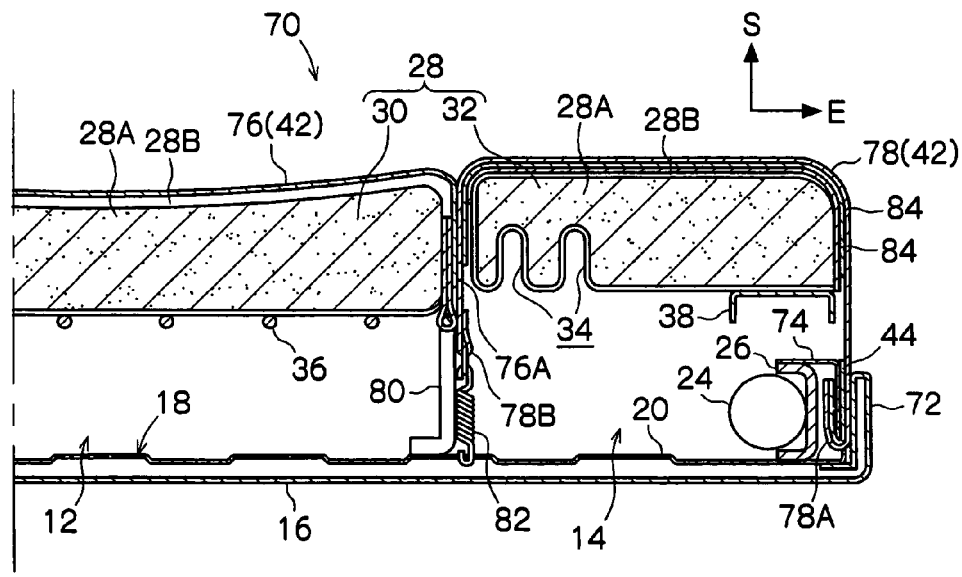
FIG. 5B is a cross-sectional view showing main portions in a stowed state of the seat relating to the fourth embodiment of the present invention.

In the seat 70 of the above-described structure, when the seat 70 is to be stowed from the state of regular use, the extending/contracting mechanisms are contraction-operated and the movable plates 38 are moved toward the seat 70 reverse side. Therefore, as shown in FIG. 5B, the pad side portions 32 are rotated toward the seat 70 reverse side with respect to the pad center portion 30, and the side portions 14 of the seat 70 are contracted. Due thereto, the thickness in the stowed state of the seat 70 becomes thinner, and, due to the contraction of the side portions 14, as shown in FIG. 2, the entire peripheral length B of the seat 70 becomes shorter than the entire peripheral length A of the seat 70 in the state of regular use.

Further, when the seat 70 is to be returned from the stowed state to the state of regular use, the extending/contracting mechanisms are extended-operated and the movable plates 38 are moved toward the seat 70 obverse side. Therefore, as shown in FIG. 5A, the pad side portions 32 are rotated toward the seat 70 obverse side with respect to the pad center portion 30, and the side portions 14 of the seat 70 are extended.

Here, when the seat 70 is to be stowed, interlockingly with the contraction of the side portions 14, the skin side portions 78 of the skin 42 are pulled into the seat 70 interior by the elastic forces (urging forces) of the tension coil springs 82 (due to the tension coil springs 82 being contracted). Due thereto, slack of the skin 42 (the skin side portions 78) at the seat 70 lateral direction end surfaces is taken in, and slack of the skin 42 at the seat 70 lateral direction end surfaces can be suppressed. Accordingly, the occurrence of useless wrinkles or tearing of the skin 42 due to the skin 42 protruding toward the lateral direction outer sides of the seat 70 can be suppressed.

Moreover, the seat 70 lateral direction outer side final ends 78A of the skin side portions 78 are disposed at the seat 70 lateral direction central sides of the extending walls 72. Therefore, gaps which open toward the reverse side of the seat 70 are not formed at the lateral direction end portions of the seat 70 (between the extending walls 72 and the fixed plates 74). Accordingly, the appearance from the reverse side of the seat 70 (the upper side when the seat 70 is stowed) can be made to be better, and entry of foreign matter such as dust or the like from the reverse side of the seat 70 into the lateral direction end portions of the seat 70 (between the extending walls 72 and the fixed plates 74) can be suppressed.

Furthermore, when the seat 70 is to be stowed, due to the pair of tapes 84 for lubrication sliding along one another, the skin side portions 78 slide with respect to the pad side portions 32, and the slack of the skin side portions 78 at the seat 70 lateral direction end surfaces is taken in. Therefore, slack of the skin side portions 78 at the seat 70 lateral direction end surfaces can be easily taken in.

Further, due to the predetermined number of concave portions 34 being formed in the seat 70 reverse side surface of the pad side portion 32, the pad side portion 32 is easily elastically contracted toward the seat 70 lateral direction central side. Therefore, when the seat 70 is to be stowed, the pad side portions 32 are elastically contracted toward the seat 70 lateral direction central side while the pad side portions 32 are rotated toward the seat 70 reverse side with respect to the pad center portion 30. Accordingly, projecting-out of the seat pad 28 from the back board 16 toward the seat 70 lateral direction outer sides can be suppressed.

Moreover, the seat 70 is covered, to the lateral direction end surfaces, by the skin 42 (the skin side portions 78) and the extending walls 72. Therefore, the appearance from the lateral direction outer sides of the seat 70 in the state of regular use of and the stowed state of the seat 70 can be made to be better.

[Fifth Embodiment]

Figure 6A:
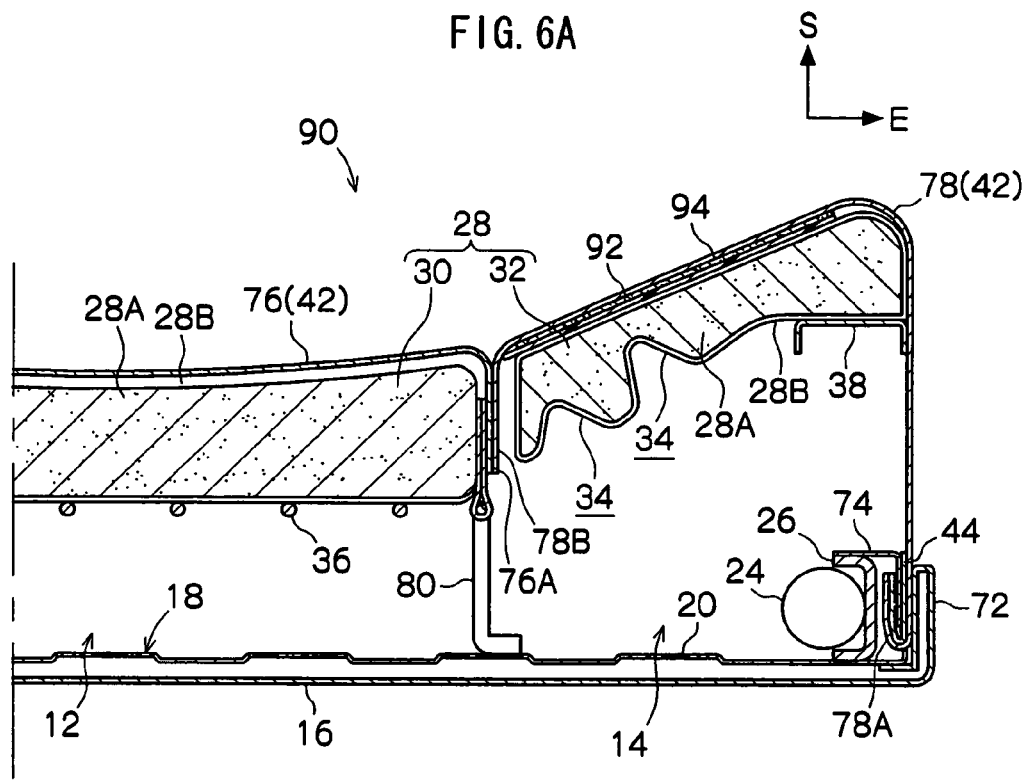
FIG. 6A is a cross-sectional view showing main portions in a state of regular use of a seat relating to a fifth embodiment of the present invention.

Main portions of a seat 90, which relates to a fifth embodiment and which is structured by applying the seat structure and the seat contraction method of the present invention, are shown in a cross-sectional view in FIG. 6A.

The seat 90 relating to the present embodiment is substantially the same structure as the above-described fourth embodiment, but differs with regard to the following points.

At the seat 90 relating to the present embodiment, the seat 90 lateral direction central side final ends 78B of the skin side portions 78 are fixed to the lateral wall 20 of the wall panel 18 by the fixing mechanisms 80.

A fold-in plate 92, which is shaped as a flat plate and is made of resin and serves as a fold-in member of the taking-in component, is fixed to the seat 90 obverse side surface of the pad side portion 32. The fold-in plate 92 projects-out toward the seat 90 lateral direction central side from the pad side portion 32. A wadding 94 serving as a pliable member is fixed to the entire seat 90 obverse side surface of the fold-in plate 92. The wadding 94 has pliability (elasticity).

Note that the tapes 84 for lubrication are not adhered to the obverses of the pad side portions 32 and the reverse surfaces of the skin side portions 78, respectively.

Next, operation of the present embodiment will be described.

Figure 6B:
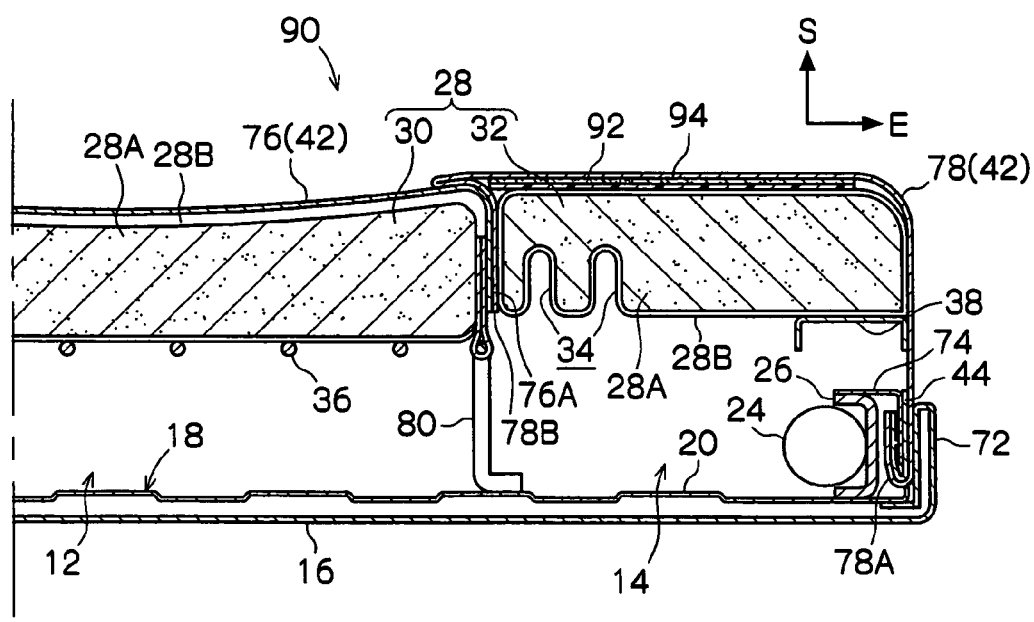
FIG. 6B is a cross-sectional view showing main portions in a stowed state of the seat relating to the fifth embodiment of the present invention.

In the seat 90 of the above-described structure, in the same way as in the above-described fourth embodiment, when the seat 90 is to be stowed from the state of regular use, the side portions 14 of the seat 90 are contracted, and the entire peripheral length B of the seat 90 in the stowed state becomes shorter than the entire peripheral length A of the seat 90 in the state of regular use, and when the seat 90 is to be returned from the stowed state to the state of regular use, the side portions 14 of the seat 90 are extended (see FIG. 2, FIG. 6A and FIG. 6B).

Here, when the seat 90 is to be stowed, interlockingly with the contraction of the side portions 14 (the rotation of the fold-in plates 92 which accompanies the rotation of the pad side portions 32), the skin side portions 78 are moved by the fold-in plates 92 toward the seat 90 central side (the seat 90 peripheral direction) and are folded in. Due thereto, slack of the skin 42 (the skin side portions 78) at the seat 90 lateral direction end surfaces is taken in.

In this way, in the present embodiment as well, effects which are similar to the above-described fourth embodiment can be achieved.

In particular, the wadding 94 is fixed to the entire seat 90 obverse side surface of the fold-in plate 92. Therefore, the disagreeable sensation (sensation of a foreign object), caused by the fold-in plate 92, of the vehicle occupant who is seated on the seat 90 in the state of regular use can be mitigated.

[Sixth Embodiment]

Figure 7A:
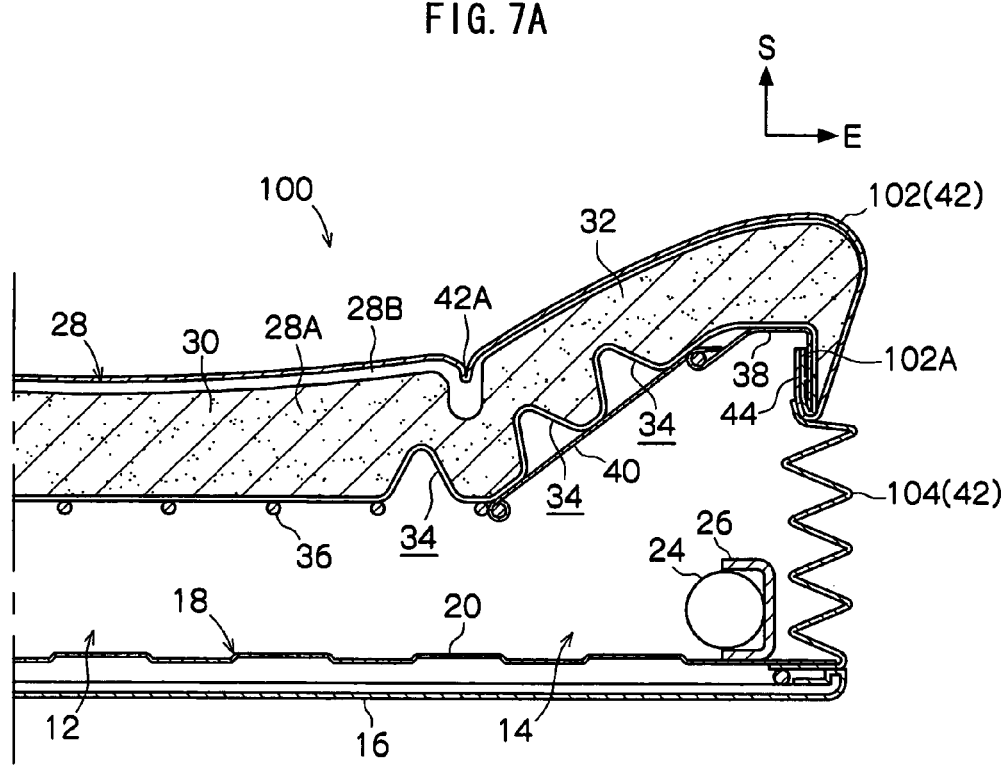
FIG. 7A is a cross-sectional view showing main portions in a state of regular use of a seat relating to a sixth embodiment of the present invention.

Main portions of a seat 100, which relates to a sixth embodiment and which is structured by applying the seat structure and the seat contraction method of the present invention, are shown in a cross-sectional view in FIG. 7A.

The seat 100 relating to the present embodiment is substantially the same structure as the above-described first embodiment, but differs with regard to the following points.

In the seat 100 relating to the present embodiment, the pair of vertical walls 22 are not provided at the wall panel 18.

The skin 42 has a skin main body 102 and a pair of bellows portions 104 which serve as contracting regions of the taking-in component. The skin main body 102 covers the seat 100 obverse side surface of the pad center portion 30 and the seat 100 obverse side surfaces and lateral direction end surfaces of the pad side portions 32. The skin main body 102 is fixed to the main body portion 28A of the seat pad 28 at the first fixing portions 42A which cover the border portions between the pad center portion 30 and the pad side portions 32. Both final ends 102A of the skin main body 102 are fixed by the fixing members 44 to the movable plates 38. The bellows portions 104 cover between the pad side portions 32 and the lateral wall 20 of the wall panel 18 at the seat 100 lateral direction end surfaces of the side portions 14. The seat 100 obverse side ends of the bellows portions 104 are fixed by the fixing members 44 to the movable plates 38 integrally with the final ends 102A of the skin main body 102. The seat 100 reverse side ends of the bellows portions 104 are fixed to the lateral direction end portions of the lateral wall 20 of the wall panel 18. The bellows portions 104 are substantially wave-shaped in cross-section and can be fold-in-contracted. The bellows portions 104 are structured from the same material as the skin main body 102, resin, or elastic bodies of rubber or the like, and are structured integrally with or separately from the skin main body 102.

Next, operation of the present embodiment will be described.

Figure 7B:
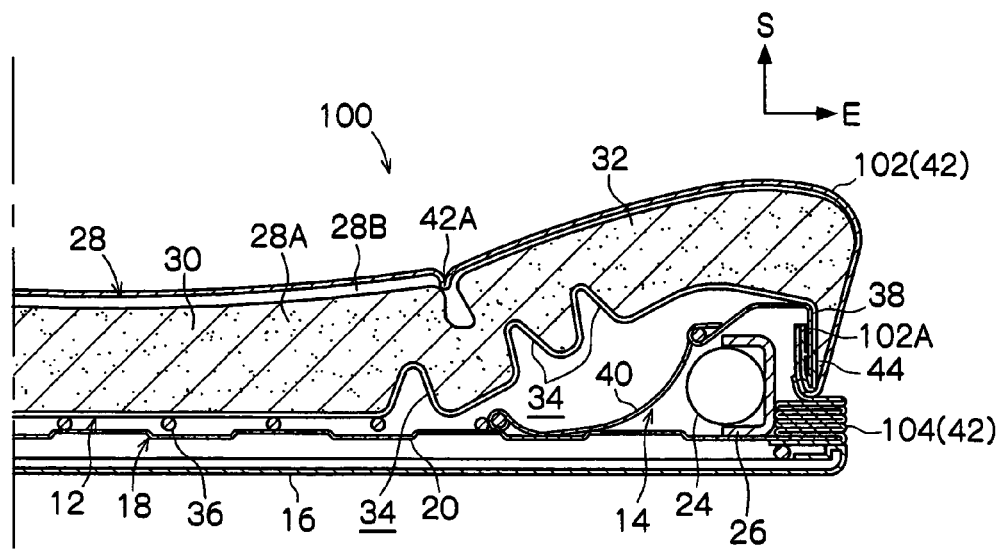
FIG. 7B is a cross-sectional view showing main portions in a stowed state of the seat relating to the sixth embodiment of the present invention.

In the seat 100 of the above-described structure, in the same way as in the above-described first embodiment, when the seat 100 is to be stowed from the state of regular use, the center portion 12 and the side portions 14 of the seat 100 are contracted, and the entire peripheral length B of the seat 100 in the stowed state becomes shorter than the entire peripheral length A of the seat 100 in the state of regular use, and when the seat 100 is to be returned from the stowed state to the state of regular use, the center portion 12 and the side portions 14 of the seat 100 are extended (see FIG. 2, FIG. 7A and FIG. 7B).

Here, when the seat 100 is to be stowed, interlockingly with the contraction of the side portions 14, the bellows portions 104 are fold-in-contracted. Due thereto, slack of the skin 42 (the bellows portions 104) at the seat 100 lateral direction end surfaces is taken in.

In this way, in the present embodiment as well, effects which are similar to the above-described first embodiment can be achieved.

Furthermore, when the seat 100 is to be stowed, the bellows portions 104 are folded in and contracted. Therefore, the structure can be made to be simple, and the durability of the skin 42 (the bellows portions 104) can be increased.

[Seventh Embodiment]

Figure 8A:
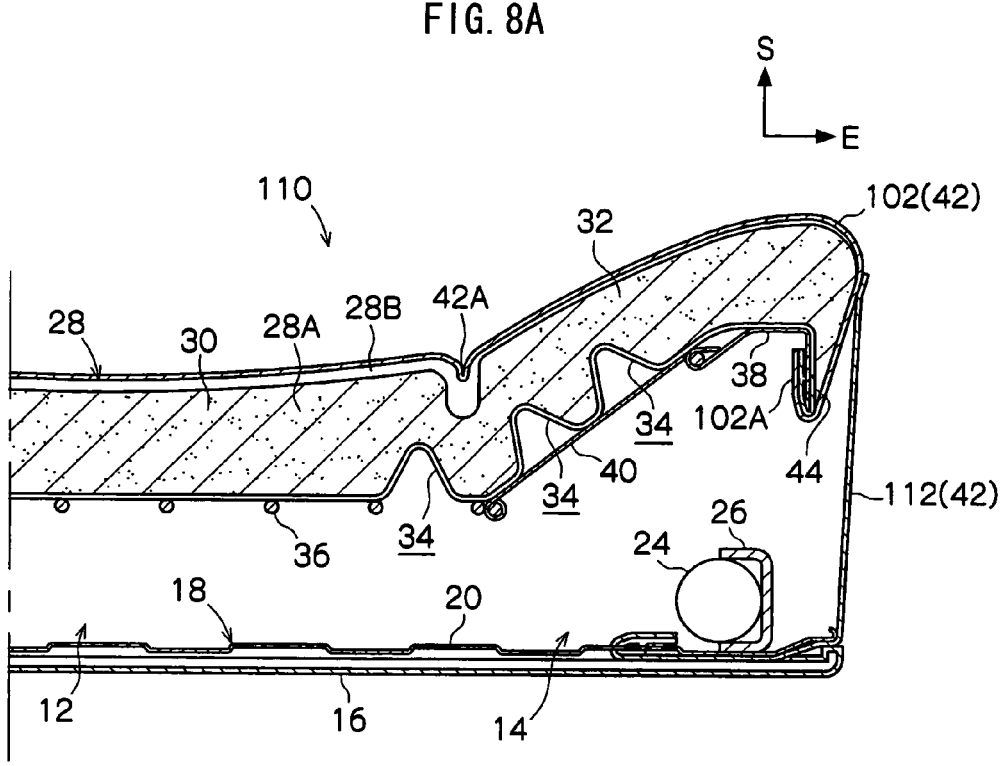
FIG. 8A is a cross-sectional view showing main portions in a state of regular use of a seat relating to a seventh embodiment of the present invention.

Main portions of a seat 110, which relates to a seventh embodiment and which is structured by applying the seat structure and the seat contraction method of the present invention, are shown in a cross-sectional view in FIG. 8A.

The seat 110 relating to the present embodiment is substantially the same structure as the above-described sixth embodiment, but differs with regard to the following points.

In the seat 110 relating to the present embodiment, the skin 42 has, instead of the pair of bellows portions 104, a pair of extending/contracting portions 112 which serve as contracting regions of the taking-in component. The extending/contracting portions 112 cover the seat 110 lateral direction end surfaces of the side portions 14. The seat 110 obverse side ends of the extending/contracting portions 112 are fixed to the seat 110 lateral direction outer side portions of the skin main body 102. The seat 110 reverse side ends of the extending/contracting portions 112 are fixed to vicinities of the lateral direction end portions of the lateral wall 20 of the wall panel 18. The extending/contracting portions 112 are structured from elastic bodies of rubber or the like, and are made to be elastically contractible.

Next, operation of the present embodiment will be described.

Figure 8B:
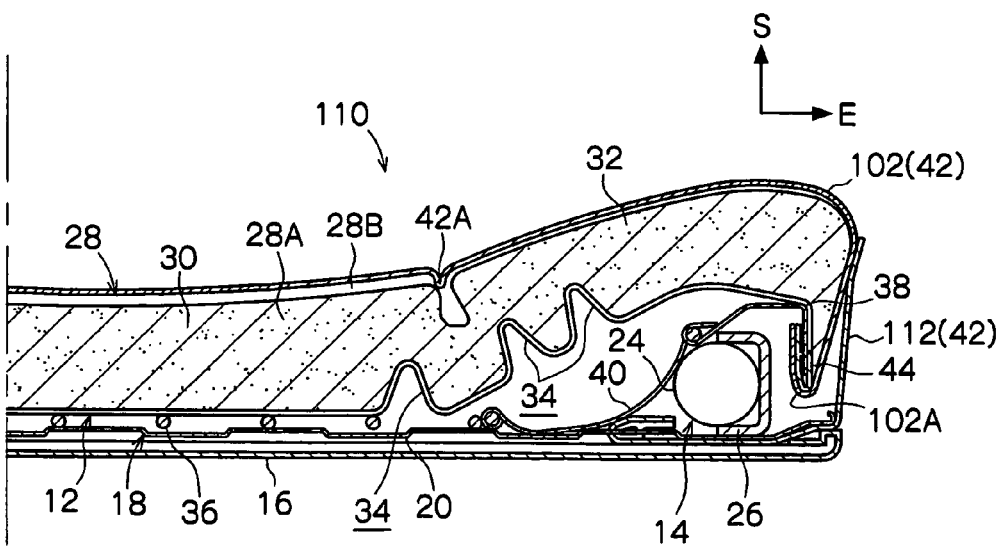
FIG. 8B is a cross-sectional view showing main portions in a stowed state of the seat relating to the seventh embodiment of the present invention.

In the seat 110 of the above-described structure, in the same way as in the above-described sixth embodiment, when the seat 110 is to be stowed from the state of regular use, the center portion 12 and the side portions 14 of the seat 110 are contracted, and the entire peripheral length B of the seat 110 in the stowed state becomes shorter than the entire peripheral length A of the seat 110 in the state of regular use, and when the seat 110 is to be returned from the stowed state to the state of regular use, the center portion 12 and the side portions 14 of the seat 110 are extended (see FIG. 2, FIG. 8A and FIG. 8B).

Here, when the seat 110 is to be stowed, interlockingly with the contraction of the side portions 14, the extending/contracting portions 112 are elastically contracted. Due thereto, slack of the skin 42 (the extending/contracting portions 112) at the seat 110 lateral direction end surfaces is taken in.

In this way, in the present embodiment as well, effects which are similar to the above-described sixth embodiment can be achieved.

In particular, when the seat 110 is to be stowed, the extending/contracting portions 112 are elastically contracted. Therefore, the structure can be made to be simple, and due to there being no portions which are folded in at the extending/contracting portions 112, the appearance can be made to be better.

[Eighth Embodiment]

Figure 9A:
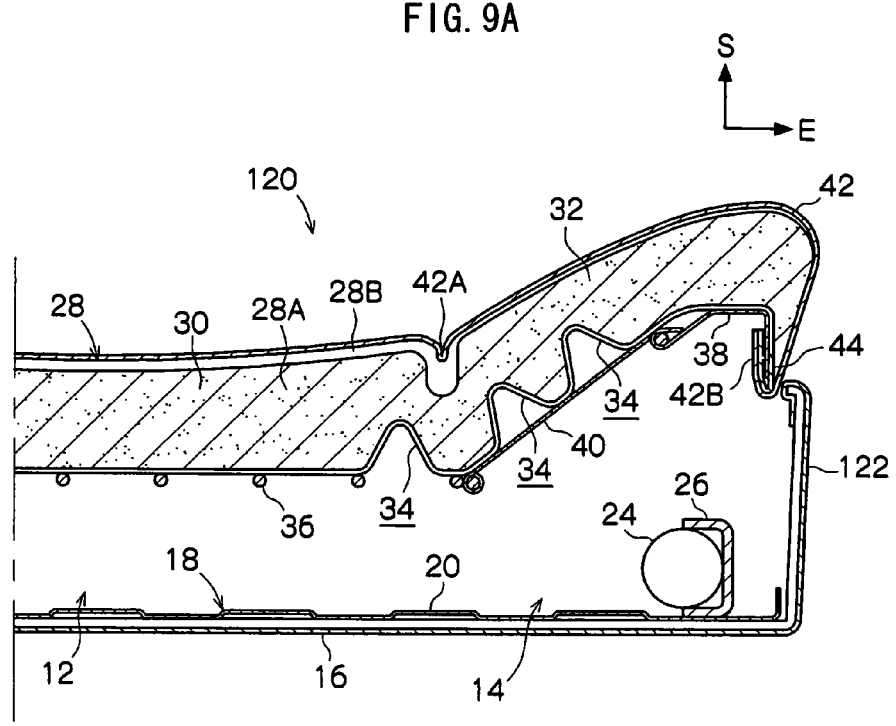
FIG. 9A is a cross-sectional view showing main portions in a state of regular use of a seat relating to an eighth embodiment of the present invention.

Main portions of a seat 120, which relates to an eighth embodiment and which is structured by applying the seat structure and the seat contraction method of the present invention, are shown in a cross-sectional view in FIG. 9A.

The seat 120 relating to the present embodiment is substantially the same structure as the above-described first embodiment, but differs with regard to the following points.

In the seat 120 relating to the present embodiment, extending walls 122 which serve as extending members are provided at the lateral direction both end portions of the back board 16. The extending walls 122 extend from the back board 16 toward the seat 120 obverse side to the positions of the pad side portions 32. Further, the pair of vertical walls 22 are not provided at the wall panel 18.

The second fixing portions 42B, which are fixed by the fixing members 44 to the movable plates 38, are the final ends of the skin 42. The skin 42 does not cover between the pad side portions 32 and the extending walls 122.

Next, operation of the present embodiment will be described.

Figure 9B:
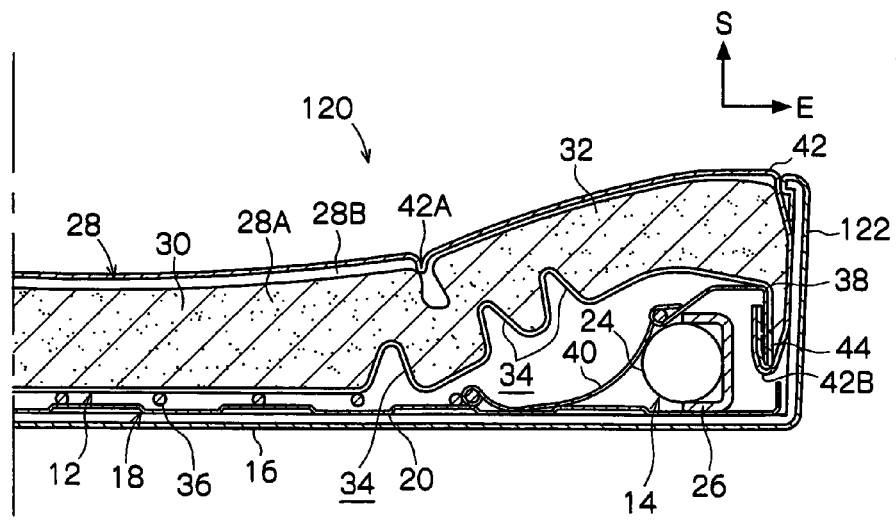
FIG. 9B is a cross-sectional view showing main portions in a stowed state of the seat relating to the eighth embodiment of the present invention.

In the seat 120 of the above-described structure, in the same way as in the above-described first embodiment, when the seat 120 is to be stowed from the state of regular use, the center portion 12 and the side portions 14 of the seat 120 are contracted, and the entire peripheral length B of the seat 120 in the stowed state becomes shorter than the entire peripheral length A of the seat 120 in the state of regular use, and when the seat 120 is to be returned from the stowed state to the state of regular use, the center portion 12 and the side portions 14 of the seat 120 are extended (see FIG. 2, FIG. 9A and FIG. 9B).

Here, the skin 24 covers only the seat pad 28, and does not cover between the pad side portions 32 and the extending walls 122. Therefore, slack of the skin 42 at the seat 120 lateral direction end surfaces due to the side portions 14 of the seat 120 being contracted does not arise. Accordingly, when the seat 120 is to be stowed, slack of the skin 42 at the seat 120 lateral direction end surfaces can be suppressed.

In this way, in the present embodiment as well, effects which are similar to the above-described first embodiment can be achieved.

In particular, when the seat 120 is stowed, the second fixing portions 42B of the skin 42 (the fix positions with the movable plates 38) are disposed further toward the seat 120 lateral direction central side than the extending walls 122 of the back board 16. Therefore, gaps which open toward the reverse side of the seat 120 are not formed at the lateral direction end portions of the seat 120 (between the extending walls 122 of the back board 16 and the movable plates 38). Accordingly, the appearance from the reverse side (upper side) of the seat 120 can be made to be better, and entry of foreign matter such as dust or the like from the reverse side of the seat 120 into the lateral direction end portions of the seat 120 (between the extending walls 122 of the back board 16 and the movable plates 38) can be suppressed.

Moreover, the seat 120 is covered, to the lateral direction end surfaces, by the skin 42 and the extending walls 122 of the back board 16. Therefore, the appearance from the lateral direction outer sides of the seat 120 in the state of regular use of and the stowed state of the seat 120 can be made to be better.

Further, when the seat 120 is to be stowed, the skin 42 is not contracted. Therefore, wrinkles can be prevented from arising at the skin 42, and the durability of the skin 42 can be increased.

[Ninth Embodiment]

Figure 10A:
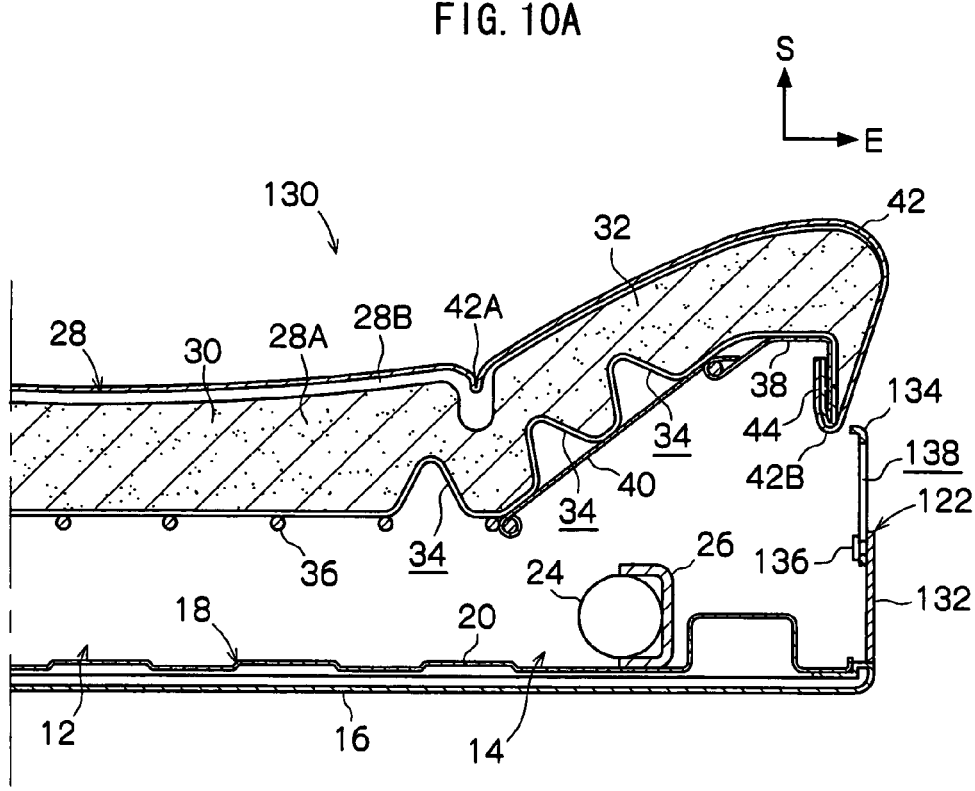
FIG. 10A is a cross-sectional view showing main portions in a state of regular use of a seat relating to a ninth embodiment of the present invention.

Main portions of a seat 130, which relates to a ninth embodiment and which is structured by applying the seat structure and the seat contraction method of the present invention, are shown in a cross-sectional view in FIG. 10A.

The seat 130 relating to the present embodiment is substantially the same structure as the above-described eighth embodiment, but differs with regard to the following points.

In the seat 130 relating to the present embodiment, the extending wall 122 of the back board 16 has a fixed wall 132 at the proximal end side and a sliding wall 134 at the distal end side. A slide pin 136 is fixed to the distal end portion of the fixed wall 132. An elongated slide hole 138 is formed to pass-through the sliding wall 134. The extending wall 122 is extended due to the slide pin 136 being fixed at the proximal end of the slide hole 138 by the frictional force between the sliding wall 134, and the fixed wall 132 and the slide pin 136. Further, due to the slide pin 136 being slid in the slide hole 138 and the sliding wall 134 being slid toward the seat 130 reverse side while the sliding wall 134 is slidingly-moved with respect to the fixed wall 132 and the slide pin 136, the extending wall 122 is made to be contractible.

Next, operation of the present embodiment will be described.

Figure 10B:
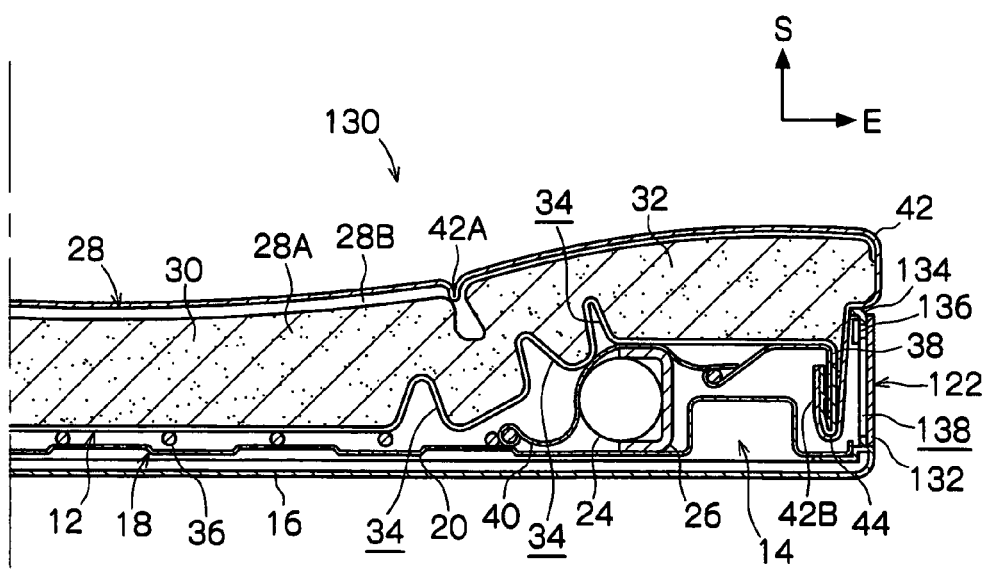
FIG. 10B is a cross-sectional view showing main portions in a stowed state of the seat relating to the ninth embodiment of the present invention.

In the seat 130 of the above-described structure, in the same way as in the above-described eighth embodiment, when the seat 130 is to be stowed from the state of regular use, the center portion 12 and the side portions 14 of the seat 130 are contracted, and the entire peripheral length B of the seat 130 in the stowed state becomes shorter than the entire peripheral length A of the seat 130 in the state of regular use, and when the seat 130 is to be returned from the stowed state to the state of regular use, the center portion 12 and the side portions 14 of the seat 130 are extended (see FIG. 2, FIG. 10A and FIG. 10B).

Here, the skin 42 covers only the seat pad 28, and does not cover between the pad side portions 32 and the extending walls 122. Therefore, slack of the skin 42 at the seat 130 lateral direction end surfaces due to the side portions 14 of the seat 130 being contracted does not arise. Accordingly, when the seat 130 is to be stowed, slack of the skin 42 at the seat 130 lateral direction end surfaces can be suppressed.

In this way, in the present embodiment as well, effects which are similar to the above-described eighth embodiment can be achieved.

Moreover, when the seat 130 is to be stowed, the extending walls 122 are contracted due to the slide pins 136 being slid in the slide holes 138 and the sliding walls 134 being slid toward the seat 130 reverse side while the sliding walls 134 are slidingly-moved with respect to the fixed walls 132 and the slide pins 136. Therefore, the side portions 14 of the seat 130 can be contracted even more thinly as compared with the above-described eighth embodiment.

[Tenth Embodiment]

Figure 11A:
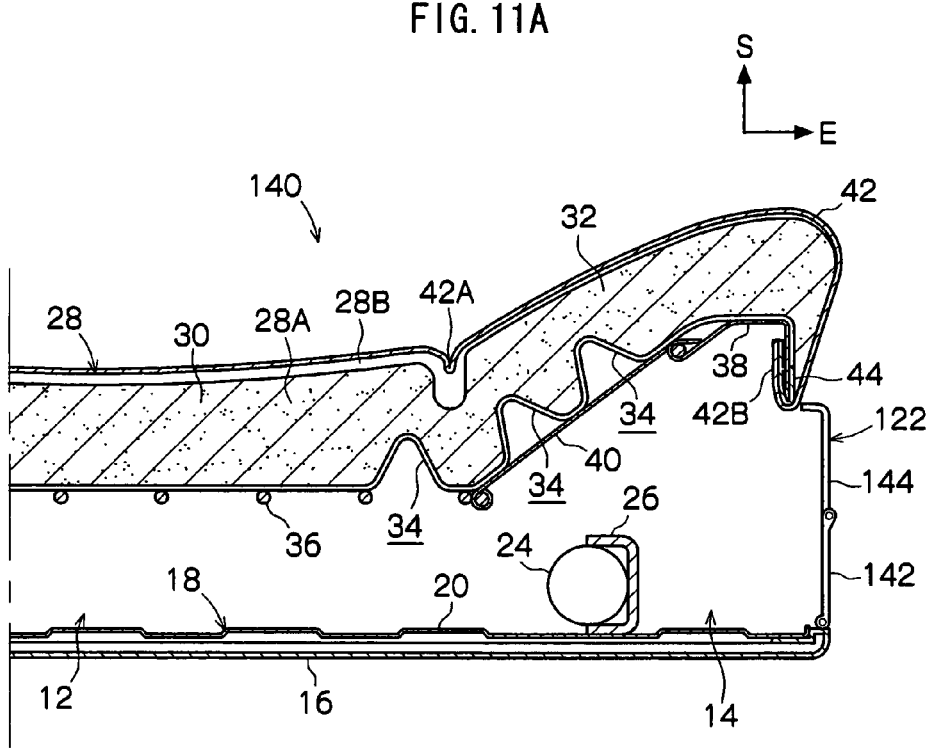
FIG. 11A is a cross-sectional view showing main portions in a state of regular use of a seat relating to a tenth embodiment of the present invention.

Main portions of a seat 140, which relates to a tenth embodiment and which is structured by applying the seat structure and the seat contraction method of the present invention, are shown in a cross-sectional view in FIG. 11A.

The seat 140 relating to the present embodiment is substantially the same structure as the above-described eighth embodiment, but differs with regard to the following points.

In the seat 140 relating to the present embodiment, the extending wall 122 of the back board 16 has a proximal end wall 142 at the proximal end side and a distal end wall 144 at the distal end side. The proximal end of the proximal end wall 142 is supported so as to be able to rotate with respect to the back board 16. The proximal end of the distal end wall 144 is supported so as to be able to rotate at the distal end of the proximal end wall 142. Rotation of the proximal end wall 142 with respect to the back board 16 is impeded by frictional force between the back board 16 and the proximal end wall 142, and rotation of the distal end wall 144 with respect to the proximal end wall 142 is impeded by frictional force between the proximal end wall 142 and the distal end wall 144, and the extending wall 122 is thereby extended. Due to the proximal end wall 142 being rotated with respect to the back board 16 and the distal end wall 144 being rotated with respect to the proximal end wall 142, the extending wall 122 is made able to contract (to fold in toward the seat 140 lateral direction central side).

Next, operation of the present embodiment will be described.

Figure 11B:
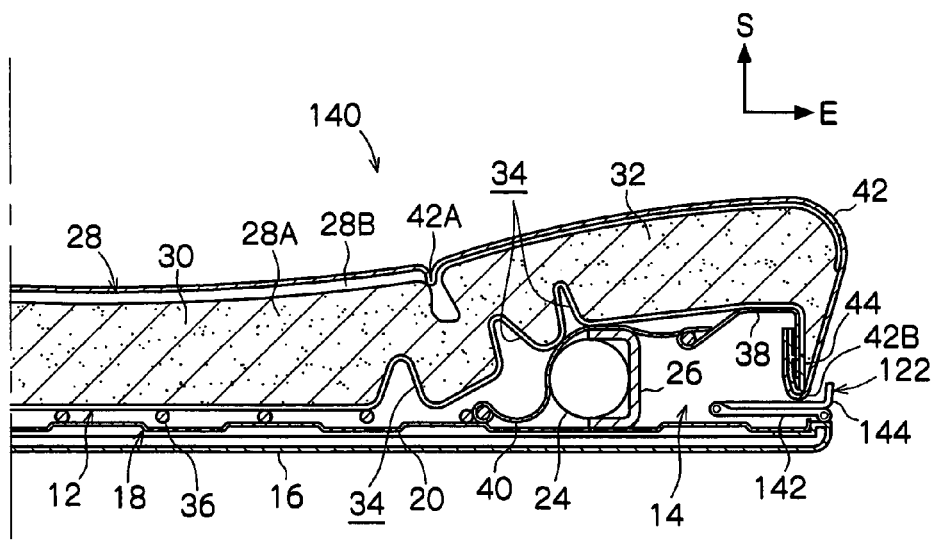
FIG. 11B is a cross-sectional view showing main portions in a stowed state of the seat relating to the tenth embodiment of the present invention.

In the seat 140 of the above-described structure, in the same way as in the above-described eighth embodiment, when the seat 140 is to be stowed from the state of regular use, the center portion 12 and the side portions 14 of the seat 140 are contracted, and the entire peripheral length B of the seat 140 in the stowed state becomes shorter than the entire peripheral length A of the seat 140 in the state of regular use, and when the seat 140 is to be returned from the stowed state to the state of regular use, the center portion 12 and the side portions 14 of the seat 140 are extended (see FIG. 2, FIG. 11A and FIG. 11B).

Here, the skin 42 covers only the seat pad 28, and does not cover between the pad side portions 32 and the extending walls 122. Therefore, slack of the skin 42 at the seat 140 lateral direction end surfaces due to the side portions 14 of the seat 140 being contracted does not arise. Accordingly, when the seat 140 is to be stowed, slack of the skin 42 at the seat 140 lateral direction end surfaces can be suppressed.

In this way, in the present embodiment as well, effects which are similar to the above-described eighth embodiment can be achieved.

Moreover, when the seat 140 is to be stowed, the extending walls 122 are contracted due to the proximal end walls 142 being rotated with respect to the back board 16 and the distal end walls 144 being rotated with respect to the proximal end walls 142. Therefore, the side portions 14 of the seat 140 can be contracted even more thinly as compared with the above-described eighth embodiment.

Industrial Applicability

In the above-described first embodiment through tenth embodiment, the seat structure and the seat contraction method of the present invention are structured so as to be applied to a seat back, but the seat structure and the seat contraction method of the present invention may be structured so as to be applied to a seat cushion.

The invention claimed is:

1. A seat structure comprising:
a contracting portion provided at an end portion of a seat, and made to be contractible;
a covering member covering the contracting portion;
an internal member provided within the contracting portion, and having elasticity, and at which a plurality of concave portions are formed at a seat reverse side surface, and at which a convex portion is formed between the concave portions;
a supporting member supporting the concave portions of the internal member from the seat reverse side by, in an extended state, contacting the convex portion; and
a taking-in component taking in slack of the covering member at the seat end surface when the contracting portion is contracted;
wherein the taking-in component includes
a non-interlocked portion on which the covering member is fixed, and which is not interlocked with contraction of the contracting portion; and
an interlocked portion which is disposed further toward a seat obverse side than the non-interlocked portion, and on which the covering member is fixed, and which is interlocked with contraction of the contracting portion and which moves the covering member toward the seat interior.

2. The seat structure of claim 1, wherein the taking-in component pulls the covering member into the seat interior interlockingly with contraction of the contracting portion.

3. The seat structure of claim 2, wherein the taking-in component has an elastic member which pulls the covering member into the seat interior interlockingly with contraction of the contracting portion.

4. The seat structure of claim 2, wherein, interlockingly with contraction of the contracting portion, the taking-in component pulls the covering member into the seat interior from the seat end surface.

5. The seat structure of claim 1, wherein the taking-in component folds in the covering member interlockingly with contraction of the contracting portion.

6. The seat structure of claim 5, wherein the taking-in component has a fold-in member which is provided so as to project from the contracting portion toward the seat central side, and which folds in the covering member interlockingly with contraction of the contracting portion.

7. The seat structure of claim 6, comprising a pliable member provided at the seat obverse side of the fold-in member.

8. The seat structure of claim 1, wherein the taking-in component has a contracting region which is provided at the covering member and which contracts interlockingly with contraction of the contracting portion.

9. The seat structure of claim 8, wherein the contracting region is at least one of a region which is wave-shaped in cross-section and an elastic region.

10. The seat structure of claim 1, wherein, when the contracting portion is contracted, a fixed position of the covering member on the interlocked portion is disposed further than the obverse side of the fold-in member.

11. The seat structure of claim 1, wherein the taking-in component further includes
a connecting member connecting a portion of the covering member between the non-interlocked portion and the interlocked portion, and an interior portion of the seat.

12. The seat structure of claim 1, comprising a sliding member which is provided between the contracting portion and the covering member and which slides the covering member with respect to the contracting portion.

* * * * *